(12) United States Patent
Robbins, III

(10) Patent No.: US 6,523,720 B1
(45) Date of Patent: Feb. 25, 2003

(54) DISPENSING CONSUMABLE LIQUIDS

(75) Inventor: Zebulon S. Robbins, III, Charlestown, MA (US)

(73) Assignee: Ocean Spray Cranberries, Inc., MA (US)

(*) Notice: Subject to any disclaimer, the term of this patent is extended or adjusted under 35 U.S.C. 154(b) by 0 days.

(21) Appl. No.: 09/607,878

(22) Filed: Jun. 30, 2000

(51) Int. Cl.[7] ............................................. G01F 11/00
(52) U.S. Cl. .................. 222/1; 222/153.05; 222/481.5; 222/568
(58) Field of Search ................ 222/153.05, 153.06, 222/153.14, 481.5, 568, 1

(56) References Cited

U.S. PATENT DOCUMENTS

| | | | |
|---|---|---|---|
| 1,983,101 A | 12/1934 | Scribner | |
| 3,153,490 A | 10/1964 | Bramming | 215/47 |
| 3,294,883 A | 12/1966 | Polka | 264/97 |
| 3,373,888 A | * 3/1968 | Fuller | 215/13 |
| 3,734,332 A | 5/1973 | Grulich | 215/9 |
| 3,827,593 A | 8/1974 | Kramb et al. | 215/9 |
| 4,129,236 A | * 12/1978 | Wrycraft et al. | 222/568 |
| D274,696 S | 7/1984 | Marsden | D9/352 |
| 4,496,064 A | 1/1985 | Beck et al. | 215/1 C |
| 4,529,372 A | 7/1985 | Saumsiegle | 425/528 |
| 4,539,463 A | 9/1985 | Piccioli et al. | 219/121 LG |
| 4,665,682 A | 5/1987 | Kerins et al. | 53/452 |
| 4,796,766 A | 1/1989 | Clark | 215/1 C |
| 5,464,110 A | 11/1995 | Heyworth | 215/223 |
| D367,611 S | 3/1996 | Wagner, III et al. | D9/447 |
| 5,605,254 A | * 2/1997 | Wagner, III et al. | 222/481.5 |
| 5,823,383 A | 10/1998 | Hins | 220/601 |
| 5,840,350 A | 11/1998 | Salemi | 425/533 |
| 6,206,251 B1 | * 3/2001 | Williams | 222/481.5 |
| 6,228,317 B1 | 5/2001 | Smith et al. | 264/521 |
| 6,230,944 B1 | * 5/2001 | Castellano et al. | 222/481.5 |

FOREIGN PATENT DOCUMENTS

| | | |
|---|---|---|
| EP | 480 836 A | 12/1990 |
| EP | 0480836 | 4/1992 |
| FR | 2790456 | 9/2000 |
| GB | 1302226 | 1/1973 |
| GB | 2034289 | 6/1980 |

OTHER PUBLICATIONS

PCT Notification of Transmittal of The International Search Report or the Declaration, dated Jan. 30, 2002.
Article reprinted from "Food & Drug Packaging", published Dec. 1997.
"Bar Supplies", from Carlisle Food Service Products catalog, pp. 136–7, published prior to Jun. 30, 1999.

* cited by examiner

*Primary Examiner*—Joseph A. Kaufman
(74) *Attorney, Agent, or Firm*—Fish & Richardson P.C.

(57) ABSTRACT

A container for holding consumable liquids for commercial food service (e.g., bar service) has a body that defines an inner cavity and has a neck extending to an opening. The neck of the container defines a first thread adapted to receive a cap to seal the cavity. The container also defines a second thread, of a diameter larger than the first thread, adapted to mate directly with a thread of a standard threaded pour spout to retain the pour spout on the container for serving liquids from the container cavity. The container is sized to fit within standard bar service speed racks and can be heat-sealed to contain perishable liquids, such as fruit juice or drink mixes.

35 Claims, 5 Drawing Sheets

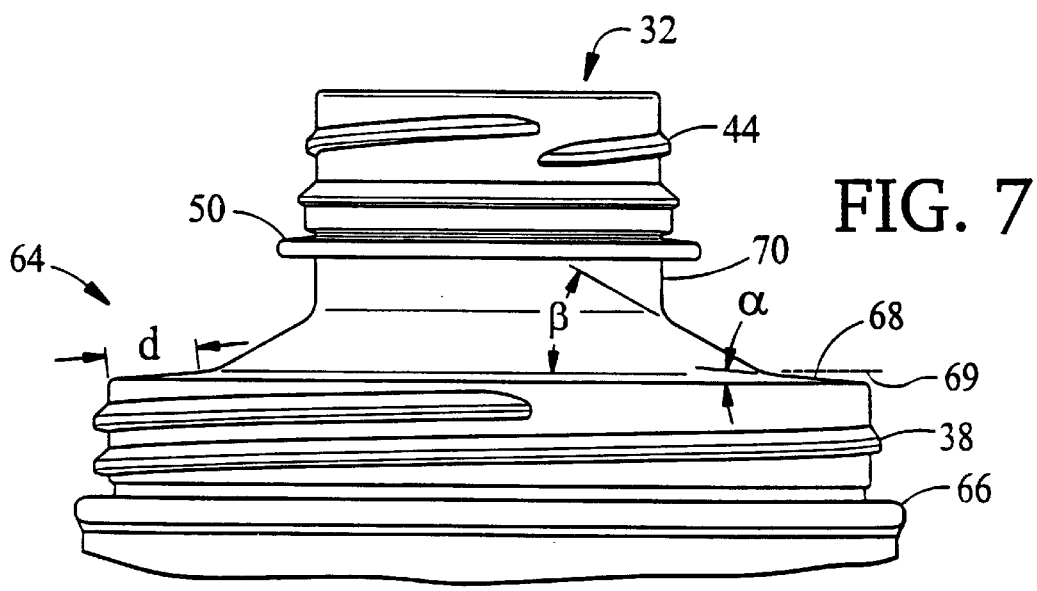
FIG. 7
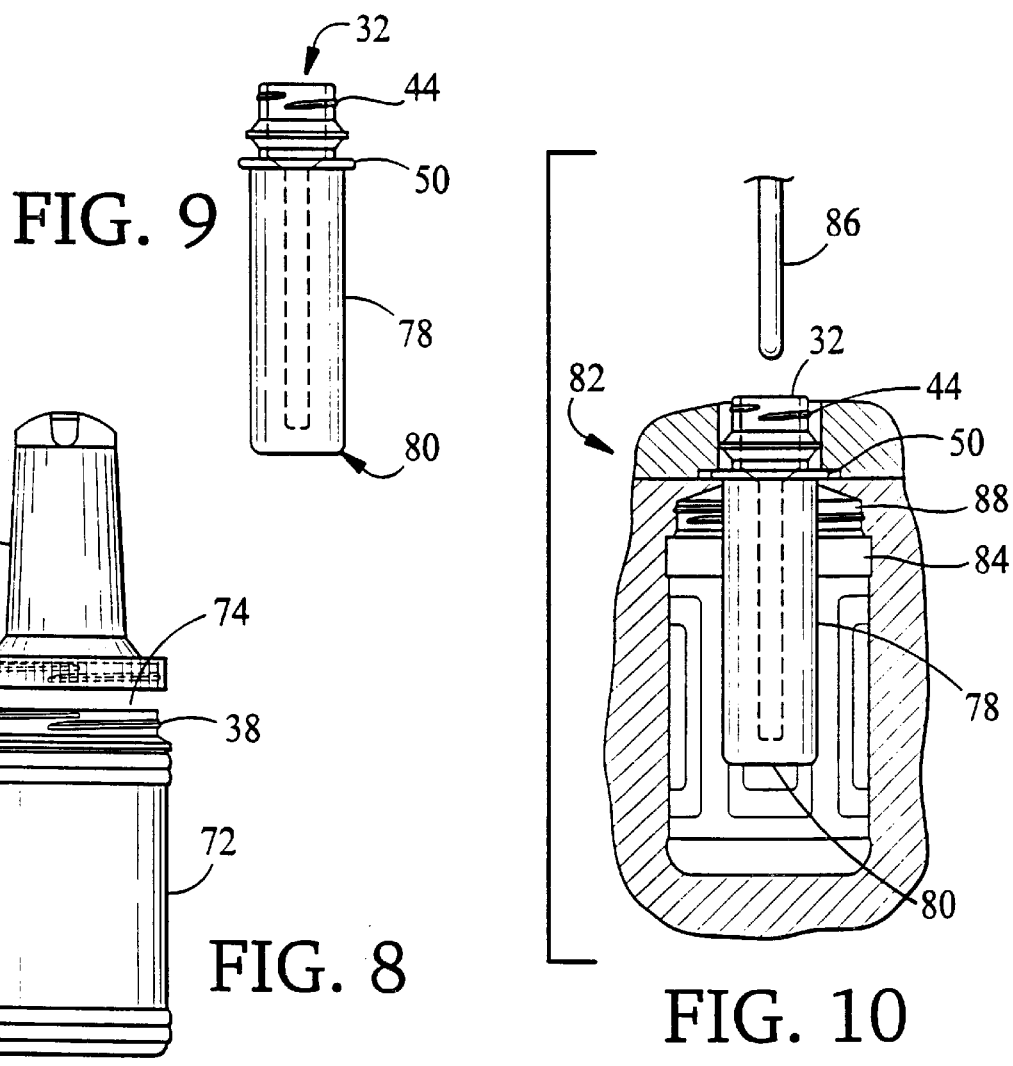
FIG. 9
FIG. 8
FIG. 10

DISPENSING CONSUMABLE LIQUIDS

TECHNICAL FIELD

This invention relates to dispensing consumable liquids, and more particularly to bottles and containers for dispensing such liquids in bar and restaurant service, and methods of their manufacture and use.

BACKGROUND

Speed and convenience are very important considerations for bar service, and bartenders typically have at their disposal a rack behind the bar for holding frequently used alcoholic spirits and mixes. Appropriately, this rack is called a "speed rack", and is sized to accept standard size alcoholic bottles 14. FIG. 1 shows a speed rack 10 mounted behind a bar 12 and stocked with several alcoholic bottles 14 and washable plastic container bottles 16 for convenient repetitive access. For fruit juices and other perishable consumables, some ice wells 18 feature a top having openings for holding juice containers 20 on ice. So that speed rack bottles need not be reopened repetitively, and to aid in pouring controlled amounts, both alcoholic bottles 14 and washable plastic bottles 16 are equipped with vented pour spouts. In the case of the reusable plastic containers 16, the pour spouts typically have a molded plastic neck portion 22 that accepts a color-coded spout tip portion 24. Their neck portions 22 (see also FIG. 3) unscrew from the bodies 26 of the containers for filling and cleaning. Such empty, reusable speed rack containers 16 are available from Carlisle Food-Service Products, in Oklahoma City, Okla., for example, and are available with bodies of several diameters and lengths, all designed to accept a common pour spout neck with an 89-400 SPI (Society of Plastics Industry) thread. Containers 16 are generally employed for dispensing mixes and other beverages that are either mixed on site or purchased in retail or bulk form, such as canned or bottled fruit juices.

Improvements in speed, convenience and sanitation in dispensing beverages at bar service facilities are always needed, as well as are reductions in cost and waste.

SUMMARY

The invention features a bottle for holding consumable liquids for commercial food service (e.g., bar service). According to one aspect of the invention, the bottle has a body that defines an inner cavity and has a neck extending to an opening. The neck of the bottle defines a first thread adapted to receive a cap to seal the cavity. The bottle also defines a second thread, of a diameter larger than the first thread, adapted to mate with a thread of a threaded pour spout to retain the pour spout on the bottle for serving liquids from the bottle cavity.

In some embodiments, the bottle is combined with a consumable liquid disposed within the cavity, and a cap releasably retained to cover the opening to seal the liquid within the bottle. In some cases the consumable liquid is perishable, in which cases the bottle is preferably heat-sealed with the perishable liquid within the cavity. The perishable liquid may comprise a fruit juice or a drink mix, for example. For some perishable liquids, a removable foil seal is provided across the opening of the bottle beneath the cap, to seal the liquid within the bottle.

Various sealing means are featured in various embodiments. These include a rib extending about the periphery of the neck of the bottle and adapted to engage an inner surface of the pour spout to form a seal between the bottle and pour spout with the pour spout mounted on the bottle; a rib extending outward from an end face of the bottle from which the neck of the bottle extends, the rib adapted to engage an inner face of the pour spout to form a seal between the bottle and pour spout with the pour spout mounted on the bottle; a recess defined within an end face of the bottle from which the neck of the bottle extends, for accommodating a rib extending from an inner face of the pour spout; a gasket seal affixed to an end face of the bottle from which the neck of the bottle extends, the gasket seal adapted to engage an inner face of the pour spout to form a seal between the bottle and pour spout with the pour spout mounted on the bottle; and an end face from which the neck of the bottle extends and that tapers outwardly in its outer region to engage and seal against an inner face of the pour spout.

For some preferred applications, the second thread is of a nominal 89-millimeter diameter to fit a standard speed rack pour spout. The first thread is preferably of a nominal diameter of between about 15 and 65 millimeters, more preferably between about 24 and 53 millimeters, and most preferably either about 38 or 43 millimeters.

The bottle is preferably sized to fit within a bar service speed rack. For example, some preferred embodiments of the bottle have a major outer dimension (e.g., a base diameter) of less than about 4.25 inches (108 millimeters).

The bottle is preferably formed of thermoplastic resin and adapted to be disposed after use. The resin of the bottle may be selected from the group consisting of polyethylene, polypropylene, polyethylene terpthalate, polyvinyl chloride, nylon, ethylene vinyl alcohol, and their copolymers and co-extrusions. One material presently preferred for many applications is polyethylene terpthalate. Another presently preferred material is a co-extrusion of polypropylene and ethylene vinyl alcohol.

According to another aspect of the invention, a container of consumable and perishable liquids for commercial food service or retail sale has a body defining an inner cavity and a large diameter opening sealed across with a removable seal, and a quantity of consumable and perishable liquid heat-sealed within the cavity. The large diameter opening of the container has an 89-millimeter nominal diameter thread adapted to mate directly with a corresponding thread of a standard bar service pour spout, for serving the liquid in multiple quantities directly from the container.

According to a third aspect of the invention, a method of forming a disposable bottle for holding consumable liquid is provided. The method comprises the steps of injection-molding from thermoplastic resin a preform in the form of a tube sealed at one end and having molded threads about its other end; placing the molded preform in a mold, with the sealed end of the preform extending through an opening into a cavity of the mold, the cavity shaped to form outer surfaces of the bottle and a large diameter thread on the outer surface of the bottle at an end of the bottle near the opening; clamping the threaded end of the preform in the opening to seal the cavity; heating the preform tube; and blowing air into the heated preform tube through its threaded end to cause the tube to expand and fill the mold cavity to form the bottle with the large diameter thread. The steps of clamping and heating, for instance, can be performed in any order in accordance with specific process parameters.

In some instances the step of injection-molding forms a rib extending about the tube preform near its threaded end, the rib adapted to locate the preform in the opening of the mold during the placing step, and to form a seal against an inner surface of a pour spout during use of the bottle to dispense consumable liquids.

According to a fourth aspect of the invention, a method of distributing consumable liquids is provided. The method comprises distributing to bar service providers filled bottles according to the first aspect of the invention, and informing the bar service providers that the second thread of the bottles is useful for retaining a pour spout on the bottle during use.

According to a fifth aspect of the invention, a method of serving drinks is provided. The method comprises the steps of removing the cap from a filled bottle according to the first aspect of the invention; attaching a pour spout to the bottle at its second thread; and tilting the bottle to pour an amount of the consumable liquid from the bottle into a glass.

The invention provides a useful container construction for dispensing consumable liquid contents, with an integral thread that can be designed to mate directly with a thread of a standard bar service pour spout, thus enabling the end user of the container (e.g., a bartender) to construct a drink dispenser by simply opening the container (e.g., by removing a threaded bottle cap and/or by removing a foil seal) and then threading a standard, commercially available pour spout directly onto the integral thread. The container and its integral thread are readily constructed from thermoplastic resin, such as by the injection/blow molding process we describe, such that the empty container may be simply discarded or recycled after removing the pour spout for another use. All of these characteristics can combine to provide a food service provider with a ready-made, easily-replaceable, disposable drink package adaptable to standard bar service equipment and yet also of a form acceptable for retail package sale (thereby lowering unit production costs through high volume manufacture).

The details of one or more embodiments of the invention are set forth in the accompanying drawings and the following description. Other features, objects, and advantages of the invention will be apparent from the description and drawings, and from the claims.

DESCRIPTION OF DRAWINGS

FIG. 7 is an enlarged view of an upper end of a third container embodiment.

FIG. 8 shows a fourth container and pour spout combination.

FIG. 9 is a plan view of an injection molded container preform.

FIG. 10 illustrates the blow molding of a container from the preform of FIG. 9.

Like reference symbols in the various drawings indicate like elements.

DETAILED DESCRIPTION

Figure 2:
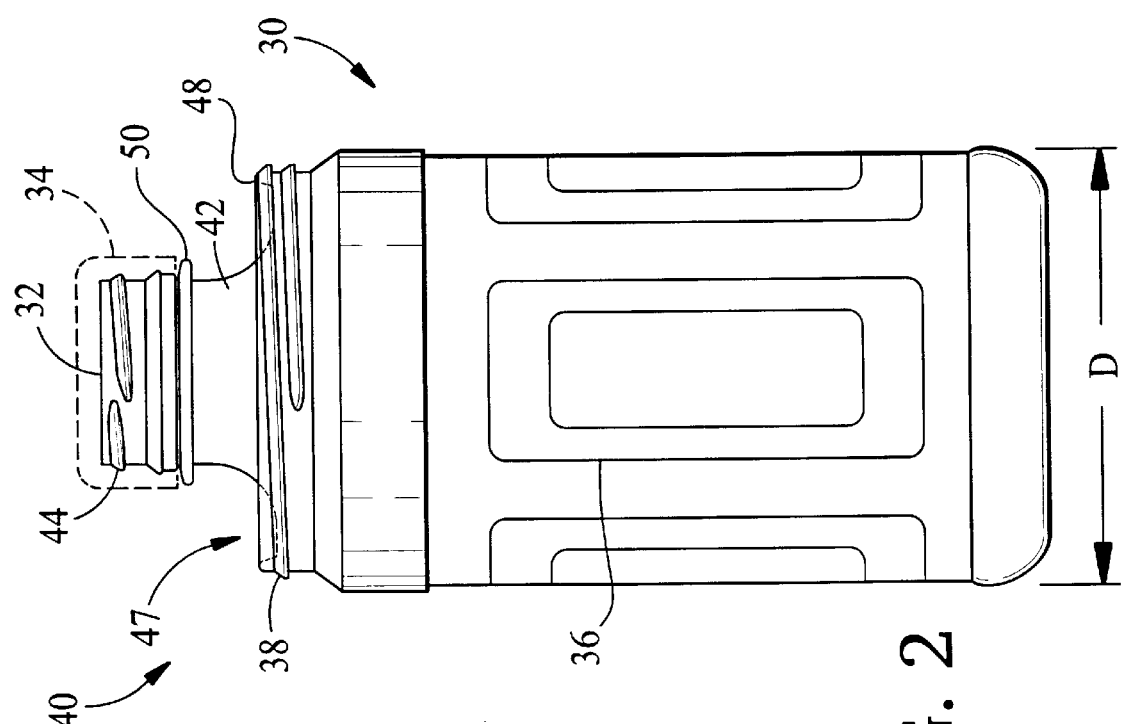
FIG. 2 is a plan view of a disposable beverage container.

Referring first to FIG. 2, container 30 is a molded plastic juice bottle for the packaging, distribution and both commercial food service and retail sale of beverages, such as perishable fruit juice or bar mix products. It has a threaded top 32 with a 43-millimeter diameter thread for accepting a molded plastic cap 34 (shown in dashed outline). The sides of the body of the container are provided with vacuum deformation panels 36 in the form of stepped depressions in the outer surface of the container, for helping to maintain the cylindrical shape of the body of the container during cooling following a hot juice filling process. The container is formed of thermoplastic resin by a combination injection/blow molding process, as described in more detail below with respect to FIGS. 9 and 10. The lower portion of container 30 has an overall diameter "D" selected to enable the container to be placed within a typical bar speed rack and also within a typical ice well top opening. Preferably, the base diameter of the container is less than about 4.25 inches (108 millimeters), more preferably less than about 4.0 inches (102 millimeters). In the illustrated embodiment, the base diameter is about 3.7 inches (94 millimeters). Other standard opening sizes and threads are also envisioned, such as, for example, an opening with a 38-millimeter diameter thread.

Figure 3:
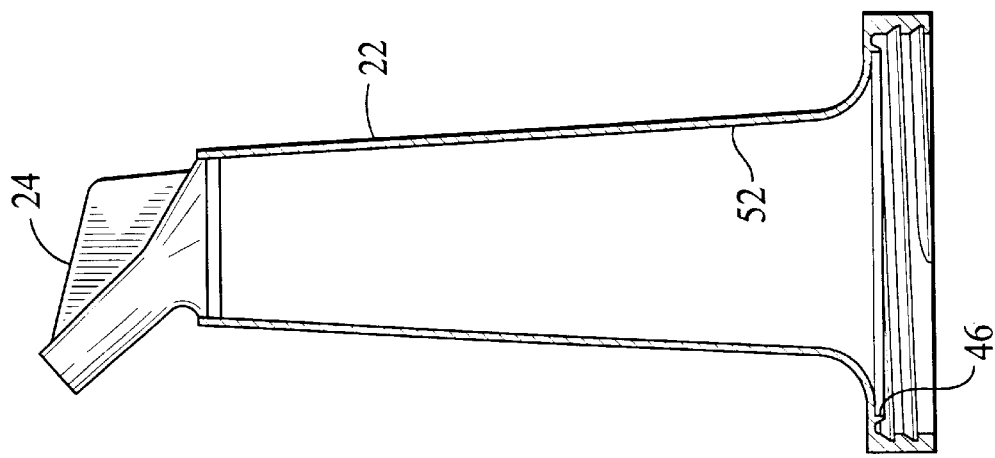
FIG. 3 is a vertical cross-section of a standard pour spout.

In accordance with the invention, disposable container 30 is also equipped with a second set of threads 38 at an upper end 40 of the container, for receiving a reusable pouring neck 22, such as the one shown in FIG. 3. Threads 38 are an 89-400 SPI thread, and are concentric with the neck 42 and cap threads 44 of the container.

Figure 1:
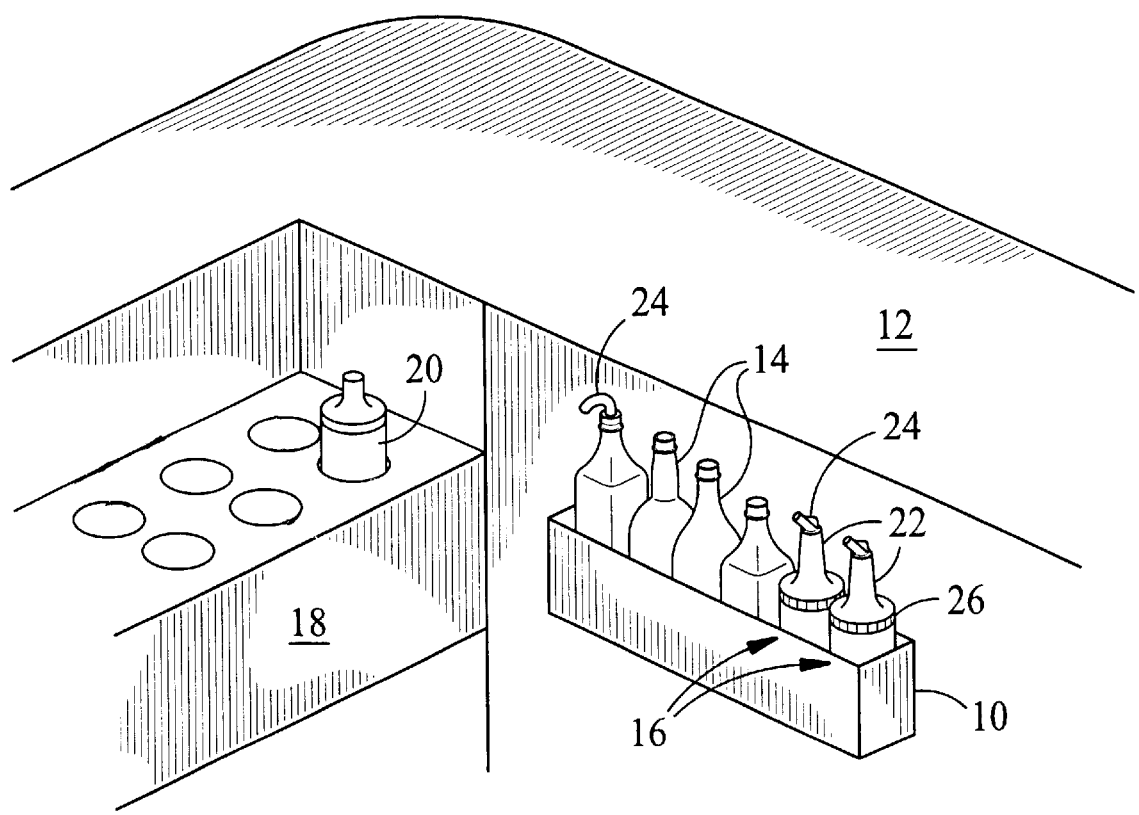
FIG. 1 illustrates a speed rack arrangement for holding beverage containers for bar service dispensing.
Figure 4:
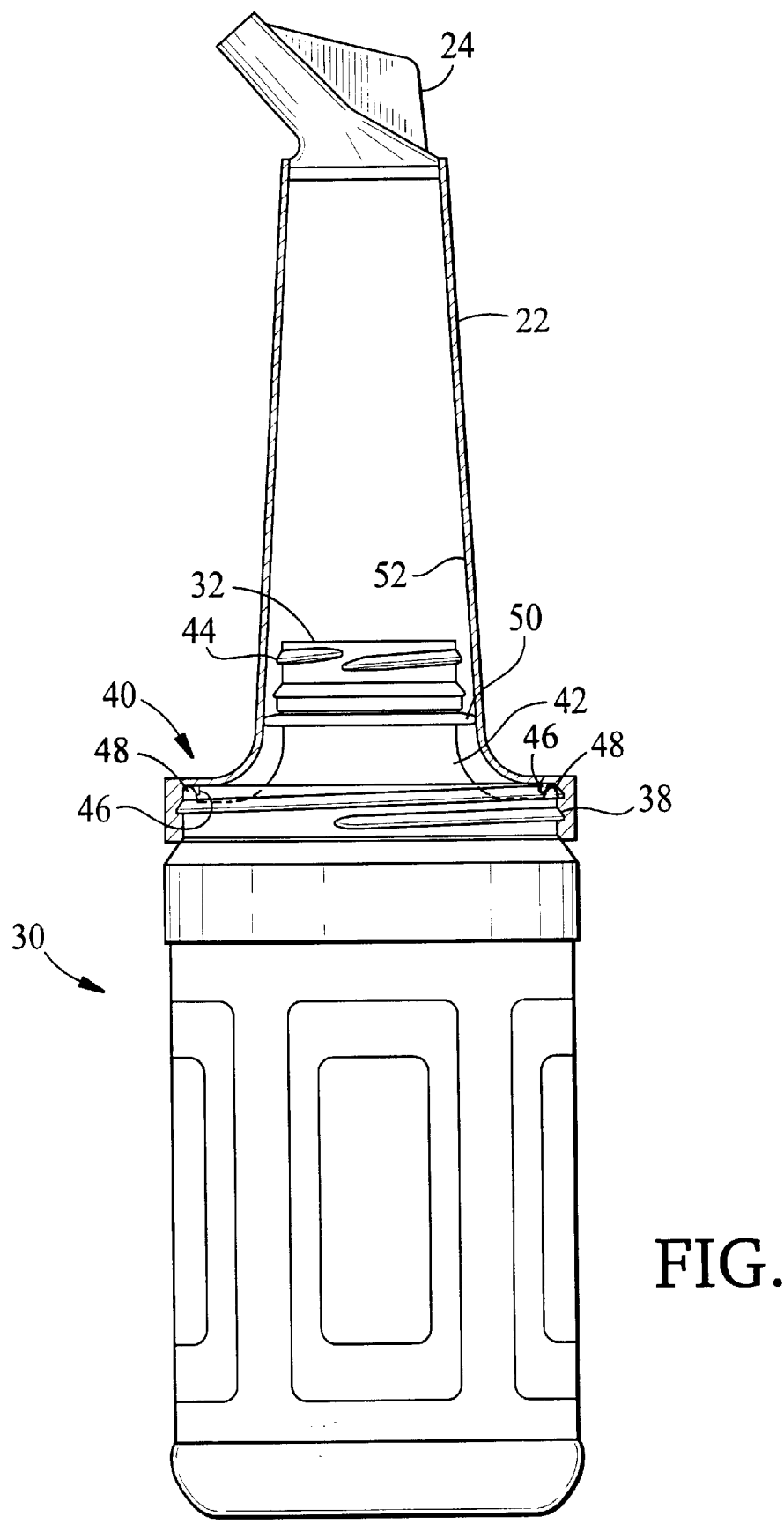
FIG. 4 illustrates the combination of the container of FIG. 2 and the pour spout of FIG. 3.

As shown in FIG. 4, with neck 22 threaded onto the upper end 40 of container 30 via spout threads 38, the entire neck 42 and cap threads 44 of the container are designed to fit within the slightly tapering internal cavity of neck 22. The spout neck is screwed in place until a rib 46 extending downward from an inner face of the spout neck extends into a recess 47 in the upper face of the container, engaging an upwardly extending circumferential rib 48 of the container to form a seal. Spout neck 22 is then readily grasped to tip container 30 for pouring the contained beverage through spout tip 24. When the contents are consumed, spout neck and tip 22 and 24 are removed for cleaning and reuse, while container 30 and the shipping cap 34 (FIG. 1) are adapted to be recycled.

As an alternative sealing arrangement, neck rib 50 of container 30 may be formed of a diameter specifically selected to engage the inner surface 52 of spout neck 22 to form a seal between container and spout just below cap threads 44 with the spout threaded into place on the container. This alternative sealing arrangement is most useful with pour spouts having consistent and circular inner surface cross-sections. As a second alternative, rib 48 on the upper container face may be substituted with a slight taper, as shown in FIG. 7.

Figure 5:
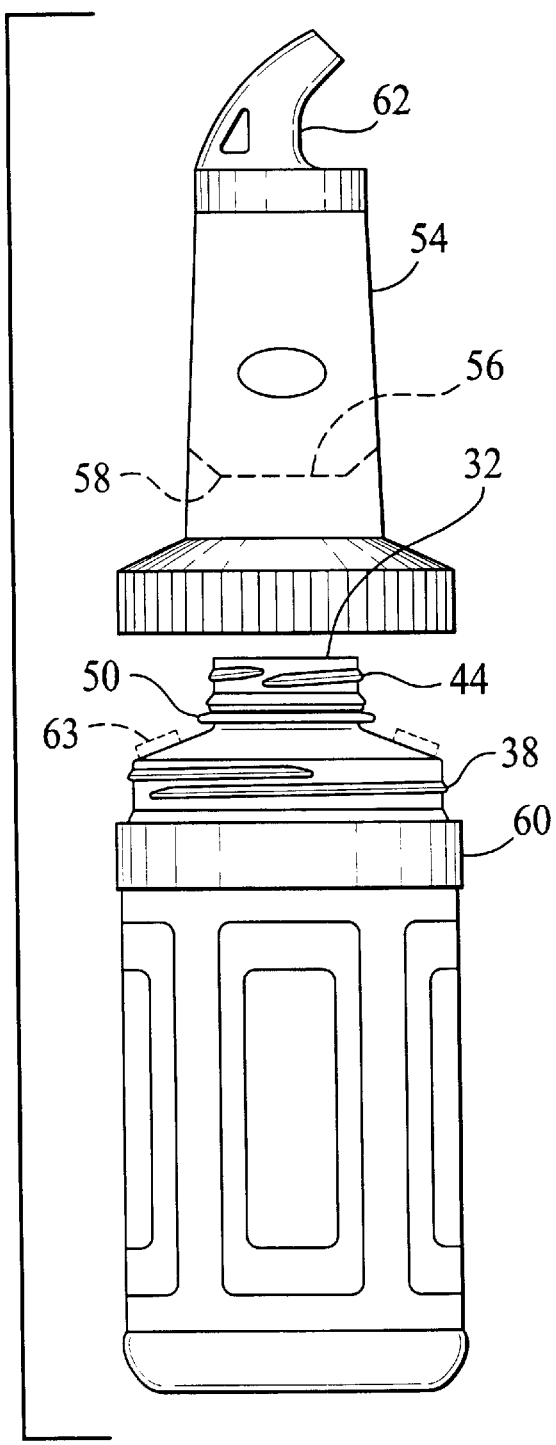
FIGS. 5 and 6 illustrate a second container and pour spout combination.
Figure 6:
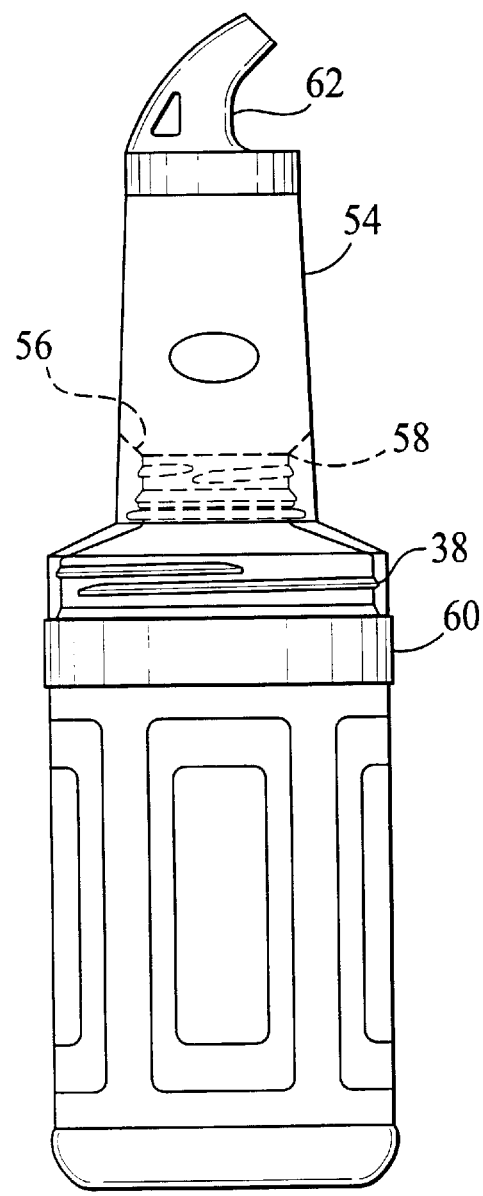

Another configuration, shown in FIGS. 5 and 6, forms a seal at opening 32 above cap threads 44. A pour spout 54 is molded to have an inner flange 56 of rigid plastic extending inward and downward from the inner surface of the spout. The inner lip 58 of the flange is positioned to seal against the rim of container opening 32 when the spout is threaded onto the top of container 60 over threads 38, as shown in FIG. 6. As with the first illustrated embodiment, the neck of the container and its cap threads 44 are configured to fit totally within spout 54. Spout tip 62 may be molded integrally with spout 54 or provided as a separate piece.

A separate gasket seal 63 (shown in dashed outline in FIG. 5) may alternatively be provided on the upper face of container 60 to form a positive compression seal with the inner surface of the pour spout. Such a gasket seal may be, for example, a ring of foam applied concentrically with container opening 32 by either a pressure sensitive adhesive or by heat sealing. The gasket seal is arranged to contact the inner surface of pour spout 54 when the spout is threaded fully onto the top of container 60.

Referring next to FIG. 7, another variation in the construction of the upper end 64 of a disposable beverage container 66 has a slightly tapered end face 68 from which the neck 70 of the container extends. Face 66 tapers upwardly from the perimeter of the base diameter of spout threads at an angle $\alpha$ of about 5 degrees over a radial distance 'd' of about 0.36 inch (9.1 millimeter), measured along the tapered surface. The slope of the end face then rises to an angle $\beta$ of about 30 degrees until it joins the vertical neck 70 of the container. The slight taper of the outer region of end face 68 is selected to cause the end face of the container to engage an inner face 69 of a mating pour spout (shown in dashed outline) only in a narrow circular region to form a liquid-tight face seal.

In all of the above-described embodiments, the disposable beverage packaging (i.e., containers 30 and 60 of FIGS. 2 and 5, respectively) is adapted to be hot-filled with perishable juice products at a bacteria-killing temperature of 190 degrees Fahrenheit, for example, then sealed while hot with a threaded cap (e.g., cap 34 in FIG. 2) to maintain the freshness of the contents. The filled containers are then readily stored, shipped and sold to individual beverage dispensing facilities for bar service. Because the spout threads 38 on the containers are relatively innocuous, such containers may also be sold at retail outlets such as grocery stores to the general public, effectively providing a single package for both bar service and domestic use. For bar service, the filled container may be chilled prior to use but is otherwise ready to be fitted with a spout and placed directly into a speed rack without having to transfer the contents to another, reusable container. The shipping cap is simply removed and discarded, and a standard, commercially available pour spout threaded into place. Leaving perishable juices in their shipping containers until they are dispensed eliminates potential contamination from improperly washed reusable containers, and saves time for the bar attendant. The disposable shipping container is easily configured, by known molding or labeling techniques, to display a logo or other product information legible to the bar attendant serving the beverages, as the single-use container is specific to its original contents.

In the embodiment of FIG. 8, a disposable container 72 has a single 89-400 SPI spout thread 38 formed about a wide-mouth opening 74 that is sealed after filling with an induction seal membrane (not shown) of the type known in the perishable foods packaging industry. Such seal membranes are commonly made of foil and applied with adhesive, passing the membrane under a magnet to heat and seal the adhesive to the container rim. Container 72 thus has no neck or cap threads, as in the above-described embodiments, but may be fitted with a shipping cap (not shown) that threads directly onto spout thread 38. Container 72 is employed as described above, except that before attaching pour spout 76 the seal membrane of the container is peeled away. The embodiments of FIGS. 2–6 are preferred for many applications, however, as their neck constructions tend to provide advantageous rigidity to the upper end of the containers and their disposable shipping caps can tend to be less expensive than wide-mouth shipping caps employed in some situations with container 72.

One method of manufacturing the above-described beverage shipping containers is illustrated by FIGS. 9 and 10. A bottle preform 78 is first injection molded of PET resin to have the opening 32, cap threads 44 and neck transfer ring 50 of the finished container. The rest of preform 78 extends from these features as an elongated tube closed at its lower end 80 and molded to have relatively thick walls. This preform 78 is then heated and placed in a blow mold 82 having a cavity 84 shaped to form the outer surface of the body of the finished container. Transfer ring 50 of the preform is clamped at an opening of cavity 84, with the bulk of the preform extending into the cavity. The open end of the heated preform is thus held securely in place as air is injected under pressure into the opening of the preform to expand the preform walls outward into cavity 84 to form the finished container. As the air is injected, a rod 86 is extended into preform 78 to push preform lower end 80 downward toward the bottom of cavity 84. According to the invention, the surface of cavity 84 is provided with features 88 to form spout threads (e.g., threads 38 of FIGS. 2 and 5) on the PET container as the final container shape is blow-molded from the threaded injection molded preform.

Preferred container materials include polyethylene, polypropylene, polyethylene terepthalate (PET), polyvinyl chloride (PVC) and nylon, although PET is particularly advantageous because of its clarity and shatter resistance, as well as its ability to effectively block oxygen that can deplete ascorbic acid in the juice and affect juice color over time. Polypropylene is a good material for such containers formed by extrusion blow-molding techniques, co-extruded with a barrier layer of ethylene vinyl alcohol (EVOH) for oxygen resistance.

A number of embodiments of the invention have been described. Nevertheless, it will be understood that various modifications may be made without departing from the spirit and scope of the invention. Accordingly, other embodiments are within the scope of the following claims.

What is claimed is:

1. A bottle for holding consumable liquids for bar service, the bottle comprising
   a body defining an inner cavity; and
   a neck extending from an upper end of the body to an opening and defining a first thread adapted to receive a cap to seal the cavity;
   the body defining a second thread, of a diameter larger than the first thread, disposed at an upper end of the body and adapted to mate with a thread of a threaded pour spout to retain the pour spout on the bottle for serving liquids from the bottle cavity.

2. The bottle of claim 1 in combination with a consumable liquid disposed within the cavity and a cap releasably retained to cover the opening.

3. The bottle of claim 2 wherein the consumable liquid is perishable, the bottle being heat-sealed with the perishable liquid within the cavity.

4. The bottle of claim 3 wherein the perishable liquid comprises fruit juice.

5. The bottle of claim 3 wherein the perishable liquid comprises a drink mix.

6. The bottle of claim 2 further comprising a removable foil seal across the opening of the bottle beneath the cap, to seal the liquid within the bottle.

7. The bottle of claim 1 wherein the neck of the bottle has a rib extending about its periphery to a diameter selected to engage an inner surface of the pour spout to form a seal between the bottle and pour spout with the pour spout mounted on the bottle.

8. The bottle of claim 1 wherein the neck of the bottle extends outward from an end face of the body, the end face having a rib extending outward and adapted to engage an inner face of the pour spout to form a seal between the bottle and pour spout with the pour spout mounted on the bottle.

9. The bottle of claim 1 wherein the neck of the bottle extends outward from an end face of the body, the end face defining a recess for accommodating a rib extending from an associated face of the pour spout.

10. The bottle of claim 1 wherein the neck of the bottle extends outward from an end face of the body, the end face tapering outwardly in an outer region thereof to engage and seal against an inner face of the pour spout.

11. The bottle of claim 1 wherein the neck of the bottle extends outward from an end face of the body, the bottle further comprising a gasket seal affixed to the end face in an outer region thereof to engage and seal against an inner face of the pour spout.

12. The bottle of claim 1 wherein the second thread is of a nominal 89-millimeter diameter to fit a standard speed rack pour spout.

13. The bottle of claim 1 wherein the first thread is of a nominal diameter of between about 15 and 65 millimeters.

14. The bottle of claim 13 wherein the first thread is of a nominal diameter of between about 24 and 53 millimeters.

15. The bottle of claim 14 wherein the first thread is of a nominal diameter of about 43 millimeters.

16. The bottle of claim 1 sized to fit within a bar service speed rack.

17. The bottle of claim 16 having a major outer dimension of less than about 4.25 inches (108 millimeters).

18. The bottle of claim 17 of circular form, having a nominal diameter less than about 4.25 inches (108 millimeters).

19. The bottle of claim 1 formed of thermoplastic resin and adapted to be recycled after use.

20. The bottle of claim 19 wherein the resin is selected from the group consisting of polyethylene, polypropylene, polyethylene terpthalate, polyvinyl chloride, nylon, ethylene vinyl alcohol, and copolymers and co-extrusions thereof.

21. The bottle of claim 19 wherein the resin comprises polyethylene terpthalate.

22. The bottle of claim 19 wherein the resin comprises a co-extrusion of polypropylene and ethylene vinyl alcohol.

23. A method of distributing consumable liquids, the method comprising distributing bottles to bar service providers, each bottle comprising a body defining an inner cavity containing a consumable liquid, and a neck extending from an upper end of the body to an opening, the neck of each bottle defining a first thread mated with a respective cap to seal its cavity, each bottle body also defining a second thread, of a diameter larger than the first thread, adapted to mate with a thread of a threaded pour spout to retain the pour spout on the bottle for serving liquids from the bottle cavity; and informing the bar service providers that the second thread of the bottles is useful for retaining a pour spout on the bottle during use.

24. A method of serving drinks, comprising providing a filled bottle comprising
a body defining an inner cavity containing a consumable liquid, and
a neck extending from an upper end of the body to an opening and defining a first thread mated with a removable cap covering the opening,
the body defining a second thread, of a diameter larger than the first thread, disposed at an upper end of the body and adapted to mate with a thread of a threaded pour spout to retain the pour spout on the bottle for serving liquids from the bottle cavity;

removing the cap from the filled bottle;

attaching a pour spout to the bottle at its second thread; and tilting the bottle to pour an amount of the consumable liquid from the bottle into a glass.

25. The method of claim 21 wherein the consumable liquid is perishable, the filled bottle being heat-sealed with the perishable liquid within the cavity.

26. The method of claim 25 wherein the perishable liquid comprises fruit juice.

27. The method of claim 25 wherein the perishable liquid comprises a drink mix.

28. The method of claim 24 further comprising removing a foil seal from across the opening of the bottle, to unseal the cavity.

29. The method of claim 24 wherein the neck of the bottle has a rib extending laterally about its periphery to a diameter selected to engage an inner surface of the pour spout to form a seal between the bottle and pour spout with the pour spout mounted on the bottle.

30. The method of claim 24 wherein the neck of the bottle extends outward from an end face of the body, the end face having a rib extending outward and adapted to engage an inner face of the pour spout to form a seal between the bottle and pour spout with the pour spout mounted on the bottle.

31. The method of claim 24 wherein the neck of the bottle extends outward from an end face of the body, the end face defining a recess for accommodating a rib extending from an associated face of the pour spout.

32. The method of claim 24 wherein the neck of the bottle extends outward from an end face of the body, the end face tapering outwardly in an outer region thereof to engage and seal against an inner face of the pour spout.

33. The method of claim 24 wherein the neck of the bottle extends outward from an end face of the body, the bottle further comprising a gasket seal affixed to the end face in an outer region thereof to engage and seal against an inner face of the pour spout.

34. The method of claim 24 wherein the second thread is of a nominal 89-millimeter diameter.

35. The method of claim 24 wherein the bottle has a major outer dimension of less than about 4.25 inches (108 millimeters).

* * * * *

UNITED STATES PATENT AND TRADEMARK OFFICE
CERTIFICATE OF CORRECTION

PATENT NO.   : 6,523,720 B1  Page 1 of 1
DATED        : February 25, 2003
INVENTOR(S)  : Zebulon S. Robbins III It is certified that error appears in the above-identified patent and that said Letters Patent is hereby corrected as shown below:

<u>Column 8,</u>
Line 20, "claim 21" should be -- claim 24 --

Signed and Sealed this

Twenty-fifth Day of November, 2003

JAMES E. ROGAN
*Director of the United States Patent and Trademark Office*